United States Patent [19]

Kim et al.

[11] 4,393,017
[45] Jul. 12, 1983

[54] APPARATUS AND METHOD FOR MAKING FOAMED RESIN PRODUCTS

[75] Inventors: Hueng T. Kim, Avon Lake; Sam D. Nehmey, Lorain, both of Ohio

[73] Assignee: The B. F. Goodrich Company, Akron, Ohio

[21] Appl. No.: 274,997

[22] Filed: Jun. 18, 1981

[51] Int. Cl.³ .................... B29D 27/00; B29F 3/00; B01F 15/02
[52] U.S. Cl. .................... 264/53; 239/551; 239/562; 239/566; 239/567; 261/DIG. 39; 264/176 R; 264/DIG. 5; 366/177; 425/376 B; 425/817 C
[58] Field of Search .......... 264/53, 211, 75, 176 R, 264/DIG. 5; 239/551, 562, 566, 567, 550, 548, 563; 261/DIG. 39; 521/145; 425/376 B, 817 C; 366/167, 168, 172, 177, 180

[56] References Cited

U.S. PATENT DOCUMENTS

| | | | |
|---|---|---|---|
| 1,833,080 | 11/1931 | Kenworthy | 239/563 |
| 2,153,356 | 4/1939 | Walker | 239/551 |
| 2,197,231 | 4/1940 | Walker | 239/551 |
| 2,483,719 | 10/1949 | Anderson | 239/562 X |
| 2,927,737 | 3/1960 | Zeuch et al. | 239/567 X |
| 3,089,857 | 5/1963 | Pottenger | 264/53 X |
| 3,121,132 | 2/1964 | Del Bene | 264/53 X |
| 3,160,688 | 12/1964 | Aykanian et al. | 264/53 |
| 3,287,477 | 11/1966 | Vesilind | 264/53 |
| 3,366,580 | 1/1968 | Kraemer et al. | 521/145 |
| 3,461,498 | 8/1969 | Ramaika | 264/53 X |
| 3,650,510 | 3/1972 | Ansel | 366/177 X |
| 3,832,431 | 8/1974 | Matthaei | 264/211 X |
| 3,890,419 | 6/1975 | Kaniecki | 264/75 X |
| 3,902,704 | 9/1975 | Ishibashi et al. | 264/53 X |
| 3,991,942 | 11/1976 | Peitl | 239/566 |
| 4,124,336 | 11/1978 | Johnson | 264/211 X |

FOREIGN PATENT DOCUMENTS 381598  7/1940  Italy ................... 239/562

*Primary Examiner*—Philip E. Anderson
*Attorney, Agent, or Firm*—George A. Kap

[57] ABSTRACT

Extrusion apparatus and method for making a cellular resin product are characterized by a conduit that extends into the extruder whereby a blowing agent is injected therethrough into the resin through a plurality of ports provided in the conduit in order to disperse the blowing agent more uniformly through the resin before it is extruded through a die into a zone of lower pressure whereupon the blowing agent expands to form numerous cells within the resin structure.

9 Claims, 6 Drawing Figures

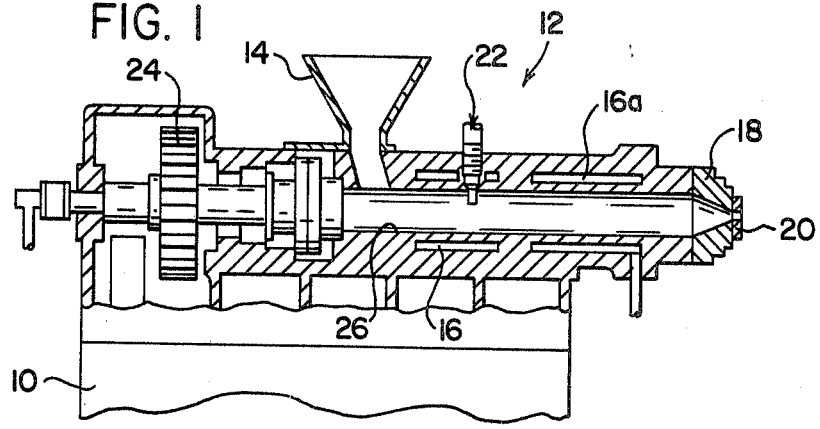
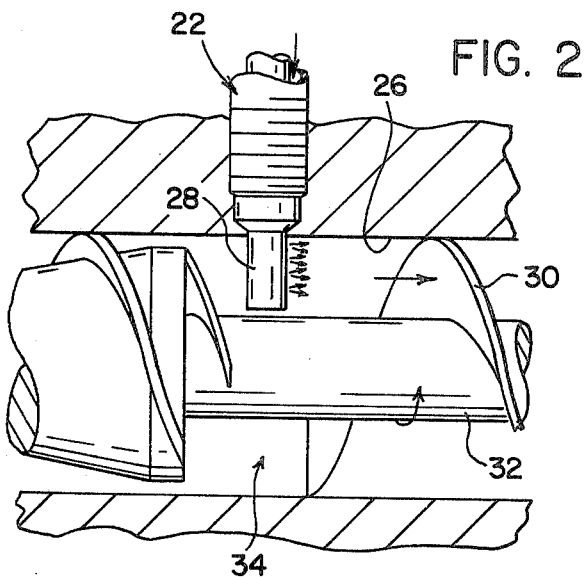

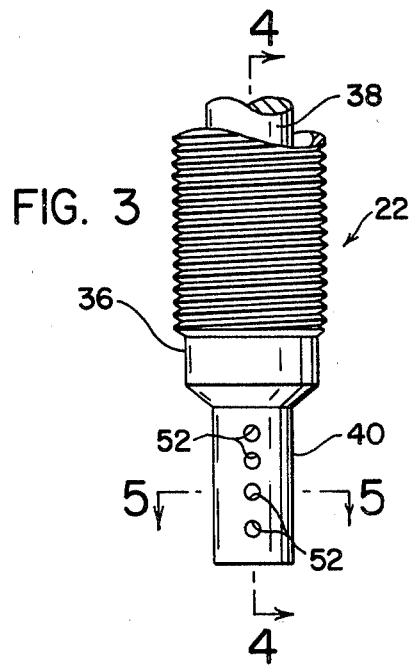
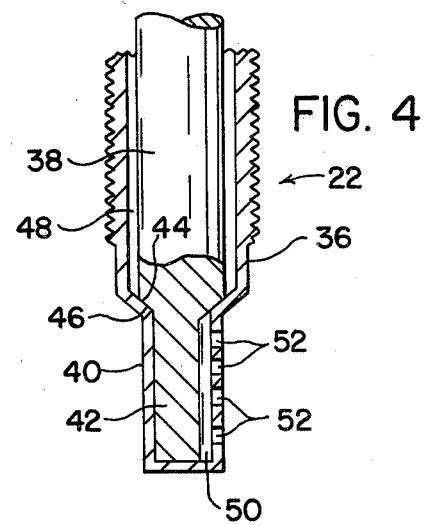
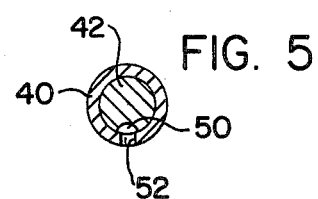
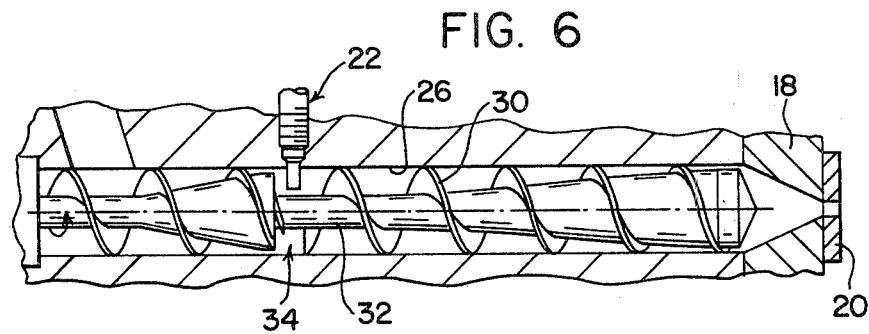

APPARATUS AND METHOD FOR MAKING FOAMED RESIN PRODUCTS

BACKGROUND OF THE DISCLOSURE

Extrusion of low density foams is well known in the art. These foams are prepared by advancing a particulate resin through an extruder where it is melted and then injected with a blowing agent. As the mixture of the molten resin and the blowing agent is further conveyed through the extruder, it is mixed, cooled to reduce vapor pressure of the blowing agent and to increase viscosity of the molten resin in order to promote formation of closed cells, and extruded through a die into a zone of lower pressure whereby the blowing agent expands to form a low density foam product.

In the prior art practice, blowing agent is introduced into molten resin through a single port with the result that there is inadequate distribution of the blowing agent within the resin. To overcome this problem, a number of approaches have been tried to promote uniform distribution of the blowing agent within the resin, including the provision of a longer agitation zone, innovative designs of feed screws in the extruder, etc. It is believed that the invention disclosed herein facilitates distribution of the blowing agent in the resin in a novel way that does not require elongated agitation zone or a unique design of the feed screw although these features can be used in conjunction with the invention disclosed herein to further improve uniform distribution of the blowing agent within the resin.

SUMMARY OF THE INVENTION

This invention pertains to making low density foam from a particulate polymeric resin that is converted from a solid to a molten state as it is conveyed through an extruder, the invention being characterized in that a blowing agent is introduced into the resin through a plurality of ports thus facilitating a more uniform distribution. This aspect is important in achieving a good quality cellular product that, in a preferred embodiment, contains a predominant proportion of closed cells.

BRIEF DESCRIPTION OF THE DRAWINGS

FIG. 1 is a side elevational view of an extruder, partly in section, without the feed screw;

FIG. 2 is a sketch of the extruder and the injection device for introducing a blowing agent into the extruder;

FIG. 3 is a frontal view of the injection device showing multiple ports for introducing a blowing agent;

FIG. 4 is a cross-sectional view of the injection device taken through plane A—A of FIG. 3;

FIG. 5 is a cross-sectional view of the injection device taken through plane B—B of FIG. 3; and FIG. 6 is a sketch of the screw and extruder that was used to carry out the experiment described herein.

DETAILED DESCRIPTION OF THE INVENTION

This invention is characterized by multiple injection ports for introducing a blowing agent into a polymeric resin. The ability to introduce a blowing agent at different levels in the resin is consonant with the desirable objective of uniformly distributing the blowing agent within the resin in order to obtain a low density foam with a uniformly distributed cellular structure preferably containing a predominant proportion of closed cells.

The apparatus shown in FIG. 1, that can be used to make a foamed product, includes a base 10 of an extruder designated generally by reference numeral 12. The extruder has a hopper 14, a heating means 16 and cooling means 16a for circulating oil, water or another medium, an extruder head 18, and a die 20. Injection device 22 is positioned downstream of the hopper, one end of which protrudes into the extruder to convey a blowing agent thereinto. A suitable motor, not shown, drives transmission means 24 that, in turn, drives a feed screw, not shown, that is normally disposed within extruder cylinder 26. The extruder can also include a crammer, not shown, disposed in the hopper for forcing the resin into the channels of the extruder.

The sketch shown in FIG. 2 shows arrangement of the injection device and the extruder in greater detail. The injection device 22 is securely disposed in extruder cylinder 26 with its lower extremity 28 projecting into extruder channel formed by a helical screw flight 30. As shown in FIG. 2, screw flight 30 is disposed on core 32 of the feed screw. In the region of injection device 22, flight 30 is removed to provide a circumferential annular space 34 within which the injection device is allowed to operate. Since it is desirable to diffuse the blowing agent in the resin as uniformly as possible, injection device 22 is positioned within extruder with a minimal of clearance between it and core 32 of the feed screw. Furthermore, in the preferred embodiment, the injection device is positioned so that it introduces a blowing agent into the flowing stream of resin in the direction of resin flow, i.e., in the direction of the extrusion die.

Additional details of the injection device are illustrated in FIGS. 3, 4 and 5 where it is shown as comprising a cylindrical outer sleeve 36 and an inner shaft 38 disposed within the sleeve. Sleeve 36 has a diametrically reduced sleeve section 40 at the lower portion thereof that is complemented by a diametrically reduced shaft section 42 that snugly yet rotatably fits within the reduced section 40 of sleeve 38. Reduced section 40 of the sleeve is connected to the main sleeve by a seating surface 44 that is defined by a circumferential inclined surface that mates with a complementing inclined seating surface 46 on shaft 38. Inclined seating surface 46 connects the reduced section 42 to the main shaft 38 and in its operative condition is slidably disposed on seating surface 44. Shaft 38 is secured at its upper extremity within sleeve 36 so that it can be raised thus disengaging the seating surfaces 44, 46. Annular chamber 48 is formed by sleeve 36 and shaft 38 that is of a reduced diameter. Reduced shaft section 42 is snugly yet rotatably disposed within reduced sleeve section 40 and is provided with an open axial slot 50 that extends from the lower extremity of reduced shaft section 42 all the way up to the seating surface 46. Communicating with axial slot 50 in the operating condition of the injection device are a plurality of ports 52 that extend through the reduced sleeve section 40. Although four ports are shown, any number can be provided, as, for example, by extending the length of reduced sleeve section 40 and reduced shaft section 42. Number of ports 52 can vary widely, however, it is desired to have from 3 to 8 of such ports. Although ports 52 are shown disposed along a vertical line, it should be understood that the arrangement can be varied by providing the ports in a helical pattern or any other pattern around the reduced sleeve section 40.

Seating surfaces 44, 46 are smooth, finely ground surfaces that are formed at complementing angular disposition. When engaged, seating surfaces 44, 46 are so well ground that the seal formed thereby is substantially impervious to a fluid. Interior surface of reduced sleeve section 40 and exterior surface of reduced shaft section 42 can also be well ground cylindrical surfaces that mate to form a fluid impervious barrier.

Operation of the apparatus for making a cellular product is commenced by charging a particulate polymer resin material, along with any suitable additives, into hopper 12 and then into the channels of the feed screw disposed in extruder cylinder 26. The feed screw conveys the resin through the extruder and during the course of its movement from the point of introduction at the hopper to the point of exit at the extrusion die, the resin is converted from a solid to a molten state. At some point intermediate the hopper and the extrusion die, a blowing agent is injected into the resin and mixed therewith as it is conveyed through the extruder.

The characteristic feature of this invention resides in the injection of the blowing agent into the resin. As shown in the drawings, particularly FIGS. 2 and 4, the blowing agent is introduced into the annular chamber 48 of the stationary injection device 22. This device protrudes into extruder cylinder 26 and resides in the annular space 34 created by cutting out a circumferential portion of screw flight 30. In such an arrangement, the path of the injection device 22 is unobstructed as flight 30 on core 32 of the feed screw is rotated. The resin flows from right to left, as viewed in FIG. 2, occupying the annular space between extruder cylinder 26 and core 32 of the feed screw. The injection device is positioned within the extruder so as to allow for a small clearance between its lower extremity and core 32 of the feed screw. In this disposition, the lower portion of the reduced section is substantially completely immersed in the resin with the result that ports 52 are also submerged in the resin.

As the blowing agent advances down through chamber 48, it encounters a fluid impervious barrier formed by the seating surfaces 44, 46 that are in contact with each other, as shown in FIG. 4. With the arrangement of ports shown in FIG. 4, the blowing agent cannot be conveyed into slot 50. To allow for introduction of the blowing agent into the resin through ports 52, shaft 38 is raised relative to sleeve 36 to disengage seating surfaces 44, 46 whereby the blowing agent enters slot 50 and out through ports 52. It should also be apparent that flow of a blowing agent through ports 52 can be shut-off by merely turning shaft 38 relative to sleeve 36 whereby reduced shaft section 42 blocks ports 52.

As is evident from FIG. 2, ports 52 are positioned within the extruder so that they look downstream in the direction of the extruder exit. As the blowing agent is introduced into the resin, its flow pattern coincides with that of the resin, i.e., it flows in the same direction as the resin. This positioning of the ports is more advantageous than other dispositions for the reason that the resin, whether in molten or solid state, presents a relatively large surface area for contacting with a blowing agent. This is made possible due to formation of a void or pocket on the downstream side of the injection device the depth of which is the thickness of the resin in the vicinity of the injection device. The void presents the surface area of the resin for contact with a blowing agent. Creation of such void would be difficult or impossible if the injection ports were disposed on the upstream side of the injection device.

Since the blowing agent is under pressure when it is injected into the resin and is therefore a liquid, it is fairly uniformly mixed with the resin in the screw channel along the radial extent of the space between core 32 of the feed screw and extruder cylinder 26. Further mixing takes place as the resin and the blowing agent are conveyed by the feed screw through the extruder. A cellular product is produced when the mixture of resin and blowing agent is extruded through the die into a zone of lower pressure whereupon the blowing agent expands to form the cells within the resin structure.

The method of extruding a cellular product includes the steps of charging a particulate resin into the extruder, conveying the resin through the extruder by means of a feed screw, melting the resin as it is conveyed through the extruder, introducing a blowing agent into the resin in a plurality of streams disposed in the space between core of the feed screw and extruder cylinder whereby the blowing agent is dispersed in the resin through a vertical section of the resin disposed in a screw channel, mixing the resin and the blowing agent, and extruding the mixture into a zone of reduced pressure whereby the blowing agent expands to form numerous cells in the resin. The characteristic feature of this extrusion method resides in the step of introducing the blowing agent in a plurality of streams in order to disperse same in the resin fairly uniformly as the resin is conveyed through the injection zone. Improved mixing of the resin and the blowing agent attained in this way results in numerous advantages such as reduction in sorption time for blowing agent, reduction in screw length, improved dispersion of the blowing agent in the resin, and reduction in the incidence of hard particles which results in a product of lower density.

Suitable resins that can be foamed by the apparatus and the method disclosed herein are selected from thermoplastic resins that include cellulose ethers and esters; homopolymers and interpolymers of monomeric compounds containing the vinylidene group $CH_2=C<$, such as vinyl halides and vinylidene halides; olefins such as ethylene and propylene; vinyl esters of carboxylic acids such as vinyl acetate and vinyl benzoate; vinyl ethers such as vinyl methyl ether; unsaturated carboxylic acids and derivatives thereof such as acrylic acid and methacrylic acid and esters thereof with alcohols of 1 to 18 carbon atoms such as methyl and ethyl in methacrylate, acrylamide, methacrylonitrile, and acrylonitrile; vinyl aromatic compounds such as styrene, alpha-methylstyrene, vinyl toluenes, and vinyl naphthalene. The group of vinyl aromatic resins includes styrene homopolymers an styrene interpolymers containing at least 50% by weight styrene and up to 50% by weight of a vinylidene monomer interpolymerized therewith, such as butadiene, acrylonitrile, alpha-methylstyrene, and the like. The vinyl chloride resins can be homopolymers or copolymers containing at least 20 mole percent, preferably about 60 mole percent, of vinyl chloride.

The preferred feed resin, in powder or pellet form, is chlorinated polyvinyl chloride with a minimum chlorine content of at least 60% by weight while for practical purposes, the maximum chlorine content feasible is about 75% by weight. Preferably, the chlorine content is about 64 to 73% by weight. As the chlorine content of the resin is increased from 60% to 64%, ability of the resin to tolerate high temperatures is increased from about 80° C. to abut 100° C., thus enabling the polymer to better withstand contact with hot objects. Furthermore, increasing chlorine content of the resin from 60% to 64% also makes it easier to retain the blowing agents within the resin. The resin can be stabilized by admixing known antioxidants and other additives.

In place of chlorinated polyvinyl chloride, there can be used a mixture of chlorinated polyvinyl chloride with a minor amount of other polymer or copolymer of vinyl chloride with a minor amount of another monomer, as long as the properties of the starting material do not differ significantly from those of chlorinated polyvinyl chloride. It is intended that the term "chlorinated polyvinyl chloride", as used herein, include the obvious variations described above.

The chlorinated polyvinyl chloride employed in the present invention can be readily prepared by the post-chlorination of commercially available polyvinyl chloride. Prior to post-chlorination, the polyvinyl chloride generally has a chlorine content of about 56.7% by weight, a glass transition temperature from about 75° to 80° C., and a density of about 1.40 grams per cubic centimeter. Polyvinyl chloride can be post-chlorinated by a number of procedures including chlorination in a solution; chlorination in an aqueous suspension or in a suspension in a swelling agent; and by direct chlorination of dry polyvinyl chloride powder. In our work, it has been found particularly convenient to chlorinate the polyvinyl chloride in an aqueous suspension. Typical procedure for carrying out such chlorination comprises agitating an aqueous suspension of 15 parts by weight of water in a pressure vessel which has been purged with nitrogen, heating the suspension to 140° C., and introducing chlorine at a rate of about 2 parts by weight per hour until the polyvinyl chloride has been chlorinated to the desired extent.

Suitable blowing agents are the halogenated hydrocarbons containing 1 to 3 carbon atoms such as methyl chloride, methylene chloride, ethyl chloride, ethylene dichloride, n-propyl chloride, and methyl bromide. A preferred group of halogenated hydrocarbon blowing agents are chlorofluoroalkanes of from 1 to 2 carbon atoms such as trichloromonofluoromethane, dichlorodifluoromethane, dichloromonofluoromethane, monochlorodifluoromethane, trichlorotrifluoroethane, dichlorotetrafluoroethane, and monochlorotrifluoroethane. Although the blowing agent can be used in an amount of about 5% to 50%, it is preferred to have a quantity of blowing agent from about 10% to 40% by weight of the chlorinated polyvinyl chloride absorbed in the polymer at the commencement of the foaming procedure.

It is recommended to include stabilizers in the resin in case of exposure thereof to excessive or prolonged heating as a result of malfunctioning of the apparatus. Suitable stabilizers for chlorinated polyvinyl chloride include antioxidants such as 2,6-diterbutyl-4-methylphenol, thermal stabilizers such as alkyl tin and pentaerythritol, and hydrogen chloride acceptors such as epoxy stabilizers.

To increase the quantity of closed cells in the cellular product and to improve the quality of the foam, nucleating agents can be added to the resin prior to extrusion. The nucleating agents can be added in an amount of 0.2 to 5 parts by weight per 100 parts by weight of the resin. Many of the known nucleating agents are suitable, including finely divided inorganic pigments such as silica and calcium carbonate; alkali metal and aluminum silicates; mixtures of carbon dioxide liberating agents such as alkali metal bicarbonate, and a solid organic acid such as citric acid; hydrated salts such as hydrated sodium citrate; stearates such as calcium or lead stearates; any finely ground material such as talc; and mixtures of such agents.

In the preferred embodiment, the cellular product made by the apparatus and method described herein is foamed chlorinated polyvinyl chloride that has at least 60% of its cells closed, and a density of 1 to 20 pounds per cubic foot. Especially preferred product is rigid, nonflammable, thermoplastic chlorinated polyvinyl chloride that has at least 85% of its cells closed, a density of 1 to 10 pounds per cubic foot, and a thermal conductivity of less than 0.20 Btu/(hour)(ft$^2$)(°F./in.).

EXAMPLE

The experimental work described herein was carried out in a 3½ NRM extruder provided with a set of mixing pins on the downstream side and upstream side of the injection device. The type of extruder screw used is illustrated in FIG. 6. The resin formulation was composed of 100 parts by weight chlorinated polyvinyl chloride powder containing 67% chlorine, 3.0 parts butyl tin heat stabilizer, 2.4 parts lubricant composed of calcium stearate, ethylene bisstearamide and an ester of Montan wax, 3.0 parts of a low molecular weight chlorinated polyethylene, 10 parts styreneacrylonitrile rubber processing aid, 0.5 part titanium dioxide nucleating agent, 0.5 part of azobisdicarbonamide, and 0.25 part of magnesium hydroxide hydrogen chloride acceptor. Speed of the screw was 20 rpm, feed rate was 136 lbs/hr., crammer speed of 20 rpm, and Freon 11 rate was about 18.4 lbs/hr. The extruder screw was internally cooled with circulating that was at 260° F. and a pressure of 20 psi. The head pressure was 1100 psi. Temperature profile of the extruder is defined by 5 zones, zone #1 being about 7 L/D and extends between feed hopper and the injection point, zone #2 is about 5 L/D and extends from the injection point and beyond, zone #3 is about 5 L/D, and zones #4 and #5 are about 5 L/D each. Zones #2 and #3 generally define mixing and melting of the resin whereas zones #4 and #5 define cooling and metering of the resin. There is a gap of about 2–3 L/D between zones #1 and #2 and between zones #3 and #4 that accounts for 32:1 L/D for the extruder. The temperature profile for the extruder used in making one run was as follows:

Zone #1 316
Zone #2 300
Zone #3 253
Zone #4 255
Zone #5 267

The foamed product produced had a density of 2 to 3 pounds per cubic foot.

We claim:

1. Method for extruding a cellular resin product comprising charging resin into an extruder disposed horizontally, conveying the resin through the extruder by means of a feed screw disposed in the extruder, melting the resin as it is conveyed through the extruder, introducing a blowing agent into the resin through a conduit in a plurality of streams along a vertical plane through said resin and extruding the mixture of the resin and the blowing agent into a zone of lower pressure whereupon the blowing agent expands to form numerous cells in the resin.

2. Method of claim 1 wherein the plurality of streams are disposed in the space between the extruder cylinder and core of the feed screw, said method further including the steps of conveying the blowing agent into a chamber of an injection device formed by an outer sleeve and a shaft disposed in the sleeve, controlling a fluid barrier formed by complementing inclined surfaces of the sleeve and the shaft by disengaging the inclined surfaces to admit or restrict flow of the blowing agent, and conveying the blowing agent through a plurality of ports provided in the lower portion of the sleeve to form said plurality of streams.

3. Method of claim 2 wherein the plurality of streams are immersed in said resin and are disposed from bottom to top in the space between the extruder cylinder and the screw core, said resin is selected from thermoplastic resins and said blowing agent is selected from chlorofluoralkanes of 1 to 2 carbon atoms.

4. Method of claim 3 wherein said resin is chlorinated polyvinyl chloride and said blowing agent is a chlorofluoromethane said method further including the steps of conveying the blowing agent from the chamber to an open axial slot formed on the periphery of the shaft that is in communication with the ports when in operative condition to convey the blowing agent therethrough into the resin.

5. Method of claim 4 wherein said chlorinated polyvinyl chloride is in powder form and contains about 60 to 75% chlorine, said cellular product has a cell structure at least 60% of which are closed cells, and a density of about 1 to 20 pounds per cubic foot.

6. In an apparatus for extruding a cellular resin product comprising a cylinder disposed horizontally, feeding means for charging the resin into said apparatus, and extrusion screw having at least one screw flight disposed on the screw core rotatably mounted in said cylinder and longitudinally disposed therein for advacing the resin therethrough wereby the resin is progressively converted from a solid to a molten state, mixing and melting section and cooling and metering section formed by said cylinder and said extrusion screw, said cooling and metering section being disposed downstream of said mixing and melting section, the improvement comprising injection means in said apparatus for introducing a blowing agent into the resin, said injecting means extending through said cylinder and being disposed in the space between said cylinder and said core, said injection means is provided downstream of said feeding means but upstream of said mixing and melting section and comprises a conduit extending through said cylinder and disposed over said core with a small clearance therebetween with at least one port being disposed along the vertical extent of said conduit protruding into said cylinder and an unobstructed circumferential annular path within which said injection means is disposed.

7. Apparatus of claim 6 wherein said injection means comprises an outer sleeve composed of an upper section and a reduced lower section, there is a plurality of said ports and said ports being provided in said lower sleeve section, a shaft disposed within said sleeve comprising an upper section and a reduced lower shaft section, said upper shaft section being of a lesser diametrical extent than said upper sleeve section thus forming a chamber therebetween, a fluid barrier means between said chamber and said ports, and means for moving said outer sleeve relative to said shaft for opening and closing said fluid barrier means.

8. Apparatus of claim 7 wherein said ports face the exit of said apparatus and are adapted to inject a blowing agent into the moving resin, said conduit is positioned in the vicinity of said feeding means, said ports are disposed on said conduit in a vertical plane, and said fluid barrier means comprises two inclined complementary surfaces one of which connects the upper and lower sections of said sleeve whereas the other connects the upper and lower sections of said shaft, said inclined surfaces engage to provide a fluid barrier and disengage to permit flow of a fluid from said chamber to said ports.

9. Apparatus of claim 7 wherein said annular path is formed by a discontinuity in said screw flight in the region of said injection means, said lower shaft section includes an open axial slot on its exterior surface that in operative condition communicates with said ports.

* * * * *